C. T. MARCUM.
COLLAPSIBLE CRATE.
APPLICATION FILED MAY 11, 1911.
1,122,524.
Patented Dec. 29, 1914.
3 SHEETS—SHEET 2.
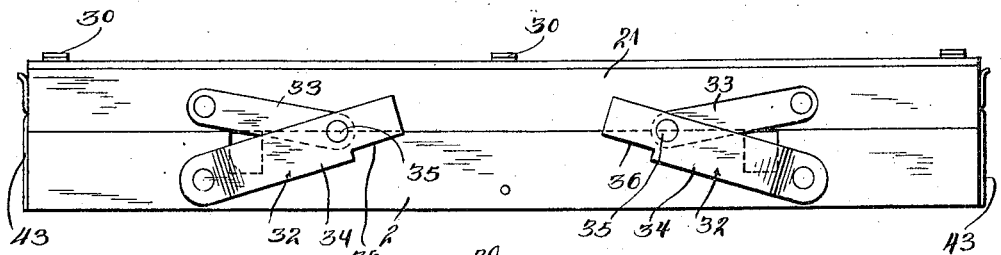
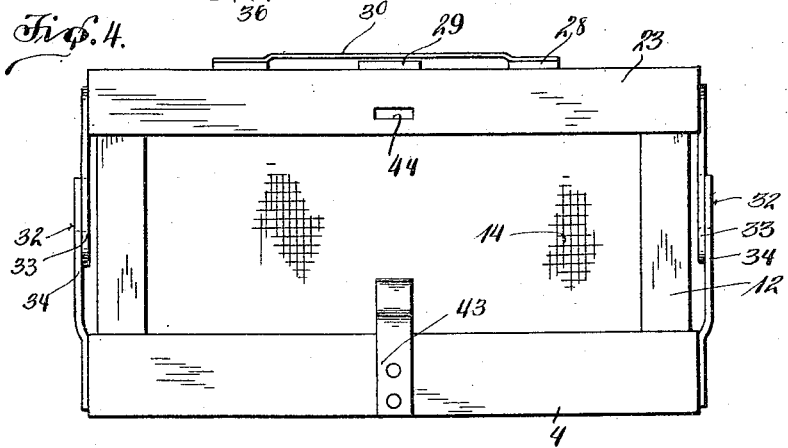
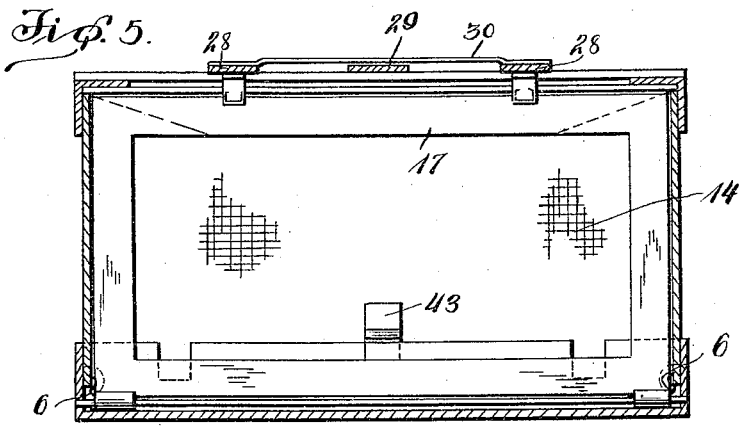
Witnesses
Ernest Crocker
N. H. Woodman.
Inventor
C. T. Marcum
By
Attorneys C. T. MARCUM.
COLLAPSIBLE CRATE.
APPLICATION FILED MAY 11, 1911.
1,122,524.
Patented Dec. 29, 1914.
3 SHEETS—SHEET 3.
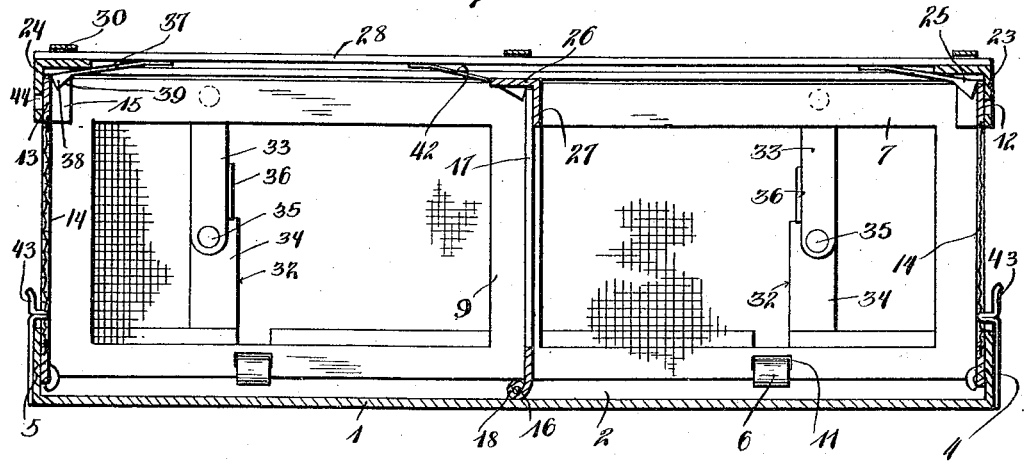
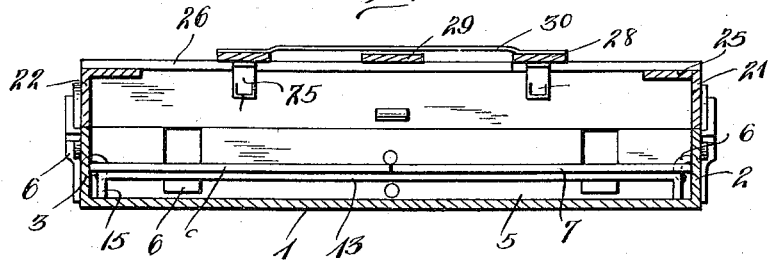
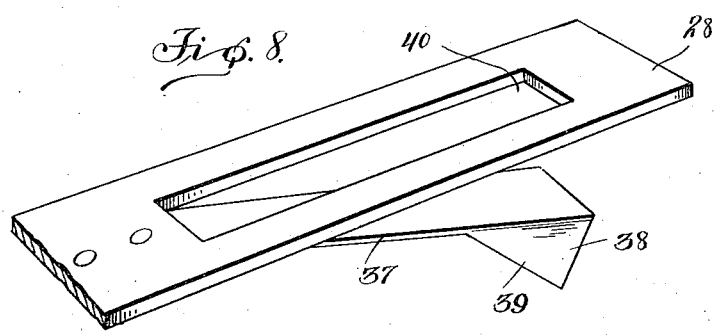
Witnesses
Ernest Crocker
W. H. Woodman
Inventor
C. T. Marcum
By 
Attorneys

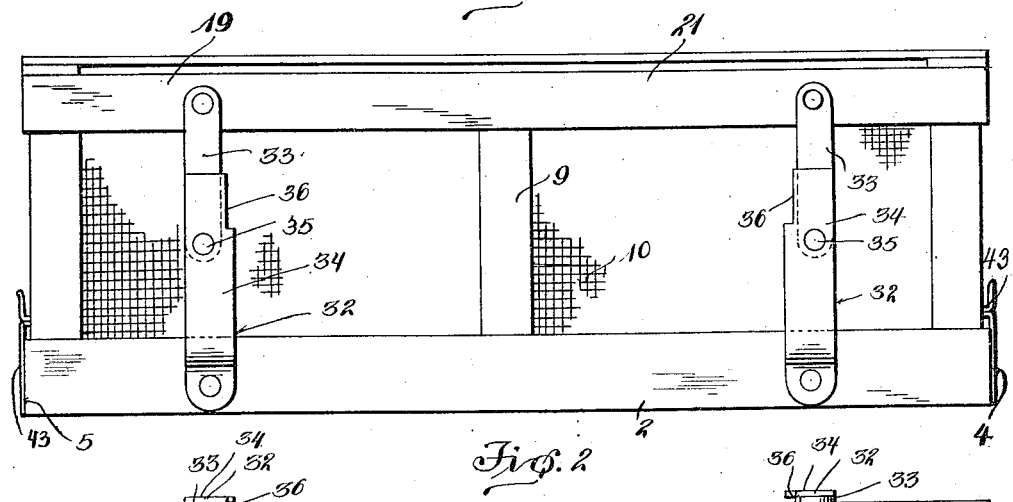
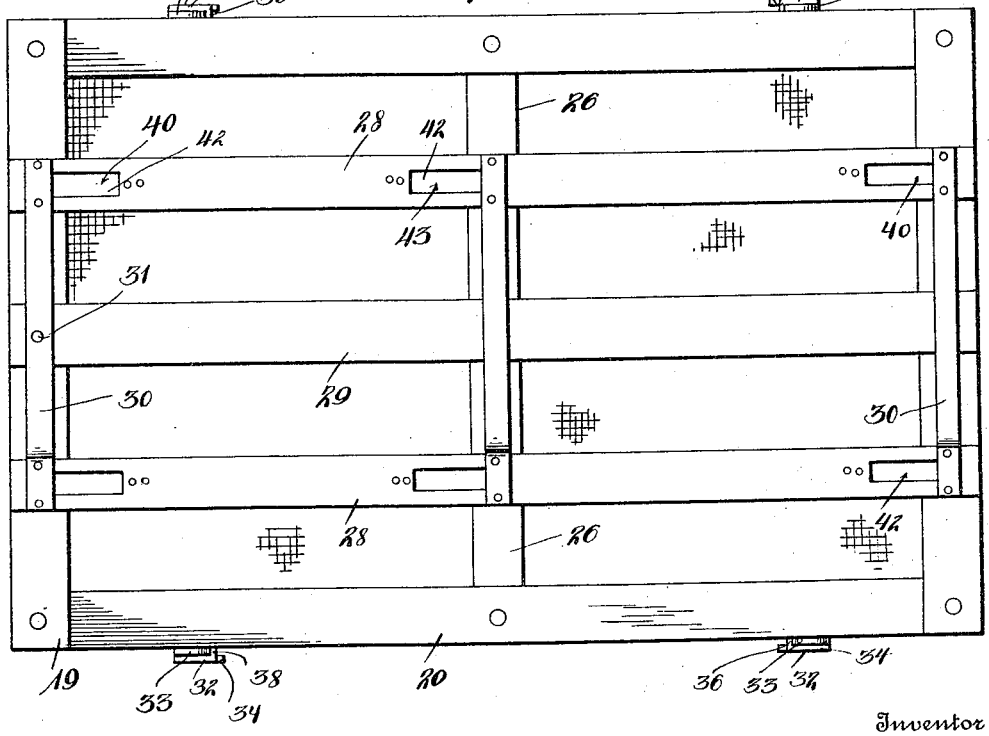

UNITED STATES PATENT OFFICE.

CAREY T. MARCUM, OF ENGLEWOOD, KANSAS.

COLLAPSIBLE CRATE.

1,122,524. Specification of Letters Patent. Patented Dec. 29, 1914.

Application filed May 11, 1911. Serial No. 626,463.

*To all whom it may concern:*

Be it known that I, CAREY T. MARCUM, a citizen of the United States, residing at Englewood, in the county of Clark, State of Kansas, have invented certain new and useful Improvements in Collapsible Crates; and I do hereby declare the following to be a full, clear, and exact description of the invention, such as will enable others skilled in the art to which it appertains to make and use the same.

My invention relates to new and useful improvements in crates, and more particularly to collapsible crates and the object of my invention is to provide a crate composed wholly of sheet metal, so constructed that there are no detached parts to become separated and lost.

A still further object of my invention is to provide a crate in which the side and end members are foldable upon each other and upon the base, and in which the top is hingedly secured to the base and adapted to be closed down upon the same and upon said sides and ends to completely cover the same.

A still further object of my invention is to provide a collapsible crate in which, when in operative position, the end members serve to maintain the side members in position, and in which the top of the crate is provided with means for automatically securing the end members in place, whereby the entire crate is secured in operative position without the use of hand operated fastening means.

With these and other objects in view, my invention will be more fully described, illustrated in the drawings and then specifically pointed out in the claims which are attached to and form a part of this application.

In the accompanying drawings which illustrate a preferred embodiment of my invention, Figure 1 is a side elevation of the crate set up. Fig. 2 is a top plan. Fig. 3 is a side elevation showing the crate in knocked down position. Fig. 4 is an end elevation of the crate set up. Fig. 5 is a vertical section through the line 5—5 of Fig. 2. Fig. 6 is a vertical section through the line 6—6 of Fig. 2. Fig. 7 is a vertical section through the line 7—7 of Fig. 3 showing the manner of folding the crate. Fig. 8 is a detail perspective of one of the locking springs employed in securing the end members of the crate in operative position.

Referring more specifically to the drawings in which similar reference numerals designate corresponding parts throughout, 1 designates in general the base of my crate, and as shown is formed from a single blank of sheet metal having its sides turned up to form the side strips 2 and 3, and its ends turned up to form the end strips 4 and 5. These side and end strips are each provided adjacent each end with a pair of parallel slits to form tongues 6.

The side members 7 and 8 are identical in construction and each consists of a rectangular frame of sheet metal, preferably provided with a reinforcing strip 9 extending transversely across the same. Secured to this frame is the netting 10, which netting forms the wall of the side. The lower portion of each of the side members 7 and 8 is provided with a pair of spaced apart slots 11, through which are inserted the tongues 6 formed from the side strips, said tongues being then bent to form a hinge whereby the sides are hingedly secured to the side strips of the base. End members 12 and 13 are secured in a like manner to the end strips 4 and 5 of the base, and these end members as shown each consist of a rectangular sheet metal frame covered with netting 14, their construction being identical with that of the side members with the exception that they are each provided at each end adjacent their top with laterally extending ears 15, which ears are bent inwardly at right angles to the frame proper, the function of said ears being to support the side members in their raised position in a manner to be hereafter more fully described.

A rod 16 extends transversely across the base or bottom of the crate and has its ends secured in the side strips thereof, and hingedly mounted upon this rod is a partition 17 identical in construction with the end members with the exception that it has no ears for engaging the side members. The means for mounting these strips upon the rod consists, as shown, in providing its lower frame member with downwardly extending tongues 18, which tongues are bent around a rod to form a hinge.

The top of the frame which as a whole is designated by the numeral 19, consists primarily of the rectangular frame 20, angular in cross section, and formed from a single strip of sheet metal, the dimensions of the top of course being identical with the dimensions of the base or bottom. This frame may be formed in any desired manner, but I have shown it as formed from a single strip of metal bent to form the side strips 21 and 22 and the end strips 23 and 24, the free ends of the strip being secured together in any suitable manner as by riveting. The upper portion of this strip is mitered at each corner and the upper portions of the side and end members or strips are bent inwardly to form the supporting flanges 25, the adjacent ends of which are secured together by rivets or other preferred means. A transverse member 26 joins the central portions of the opposite sides of the top frame member and a portion of this strip is bent downwardly to form a flange member 27, the purpose of which will hereinafter be described. This top frame may be covered with netting if desired, but I prefer to close this top with a plurality of longitudinal strips 28, the ends of which are secured to the end members of the frame by rivets, said strips being also secured to the transverse member 26, in a like manner.

A portion of the top is left open to form a door for the crate, and as a closure for this door I provide an additional longitudinal strip 29 said strip being slidably mounted in guide loops 30, which loops are formed of sheet metal and secured to the top of the end members of the frame and also to the top of the transverse member. The ends of this strip are perforated, as are the end members of the frame and the guide loops carried thereby, and it will readily be seen that by means of these perforations and the cotter pins 31 the strip may be readily secured in closed position.

The top of the crate is hingedly secured to the base, as shown, by a plurality of hinged joints which as a whole, are designated by the numeral 32. Each of these joints consists of a member 33 pivotally secured to the downwardly extending sides of the top member and the upwardly extending member 34 pivotally secured to the side strips of the bottom, the free ends of said strips being pivotally united as at 35, and the upper end of the strip 34 being continued beyond said pivotal point and having its inner edge portion bent inwardly to form a flange 36 adapted to engage with the inner edge of the member 33, whereby the hinge is adapted to break inwardly only.

Secured to the lower face of each of the longitudinal strips 28 and adjacent each end thereof is a leaf spring 37, the free end of which terminates adjacent the end members of the top frame, in a downwardly extending arm 38, each of said springs being provided adjacent said arm with angular extensions 39 which are bent downwardly as shown to form an inclined slide. The strips 28 above the ends of these springs are slotted as at 40 to allow the spring together with its downwardly extending arm to pass upwardly through the same, for a purpose to be hereinafter explained. The said strips 28 are also provided with similar springs 42 and slots 43, adjacent the transverse member 26.

The upwardly extending end strips of the base are each provided intermediate their length with the upwardly extending spring catches 43, while the downwardly extending end strips of the top are each provided with slots 44 adapted to be engaged by the said catches when the crate is in closed position.

In operation the crate is furnished to the consumer in its closed position, when as shown in Fig. 3 of the drawings the end members are folded inwardly and rest upon the base, as also does the partition member, the side members are folded inwardly and rest upon the end members and partition member, the joints of the hinges are broken inwardly and the cover is swung down upon the crate and secured to the base by the spring catches previously described. When the crate is to be used the cover is raised up to the full extent allowed by the hinges, the side members are swung upwardly until they rest against the inner faces of the downwardly extending side strips of the top, the partition member is swung upwardly past the springs 42, said springs passing up through the slots 43 to allow the partition member to pass and then swinging back into position, when as will be readily understood the partition member is held in its vertical position by means of the flange 27 upon one side and the springs 42, the sides of the partition member resting against the inner faces of the side members to maintain them in their raised position. The end members are then swung into raised position past the springs 37 in a like manner until they are secured in place between the end strips of the top and the springs. It will be seen that ears 15 of the end members rest against the upper end portion of the side members and thus assist in maintaining the sides in their raised position. In this position the crate is ready for use, and it will be seen that the end members and partition member together with the top, firmly secure the side members in position, while the springs carried by the lateral strips 28 firmly secure the end members and the partition member in place, whereby no additional securing means is required. This construction provides a crate which may be readily and quickly set up in operative position, and which at the same time may be as readily knocked down and folded for return shipment.

What I claim is:—

1. In a metallic folding crate, a flat bottom section of sheet metal having the side portions and end portions thereof upturned to form integral side and end flanges, said side and end flanges having inwardly extending tongues cut therefrom, one piece metallic side frames and one piece metallic end frames provided with slots to receive the tongues of the side and end flanges of the bottom of the crate, a metallic screen covering each side and end frame, a top for the crate comprising a rectangular frame member formed with integral depending side and end flanges against which the top portions of the side and end frames of the crate are adapted to abut when said frames are moved to vertical position, means carried by the top of the crate adapted to hold the side and end frames of the crate in vertical position against the integral side and end flanges of the top, and a hinged connection between the depending side flanges of the top and the integral side flanges of the bottom.

2. In a metallic folding crate, a flat bottom section of sheet metal having the side portions and end portions thereof upturned to form integral side and end flanges, said side and end flanges having upwardly extending tongues cut therefrom, one piece metallic side frames and one piece metallic end frames provided with slots to receive the tongues of the side and end flanges of the bottom of the crate, a metallic screen covering each side and end frame, a top for the crate comprising a rectangular frame member formed with integral depending side and end flanges against which the top portions of the side and end frames of the crate are adapted to abut when said frames are moved to vertical position, means carried by the top of the crate adapted to hold the side and end frames of the crate in vertical position against the integral side and end flanges of the top, a hinged connection between the depending side flanges of the top and the integral side flanges of the bottom, a rod extending transversely of the crate and mounted at its ends in the integral side flanges of the bottom, a folding metallic partition hingedly connected at its lower end with said rod, the upper end of said partition having a lateral flange formed integral therewith and said flange being adapted to lie in contact with the top of the crate when the partition is in vertical position.

In testimony whereof, I affix my signature, in presence of two witnesses.

CAREY T. MARCUM.

Witnesses:
J. B. ADAMS,
C. L. KING.